No. 684,005. Patented Oct. 8, 1901.
D. T. STOKES.
PARALLEL RULER.
(Application filed Jan. 5, 1900.)
(No Model.)
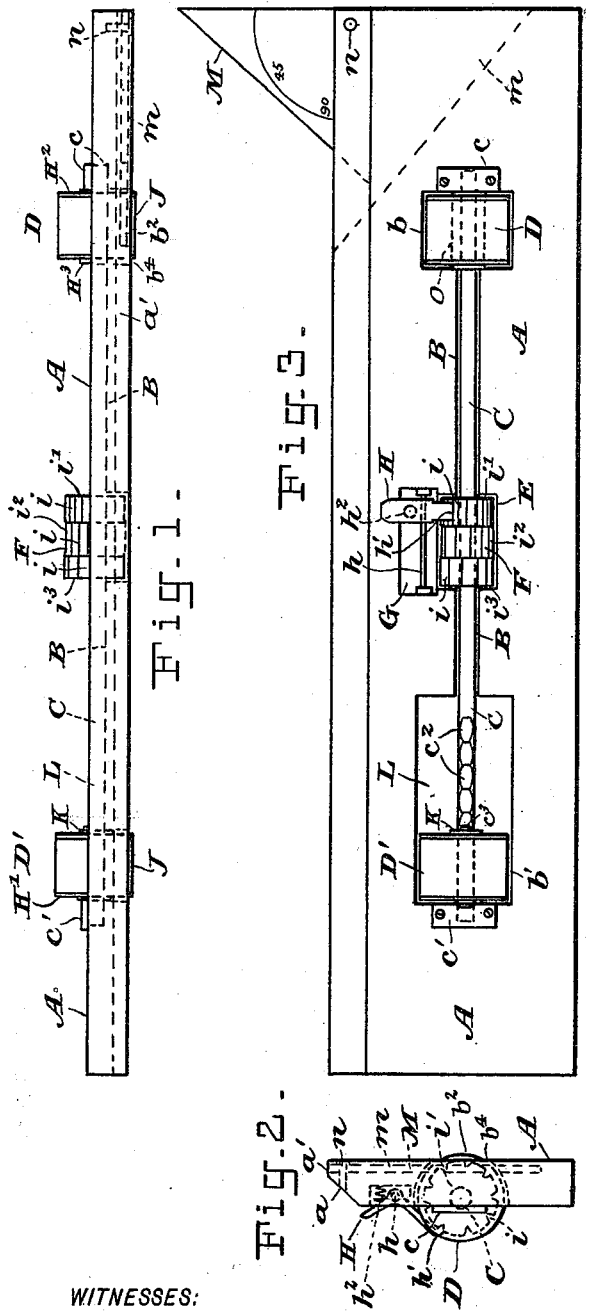
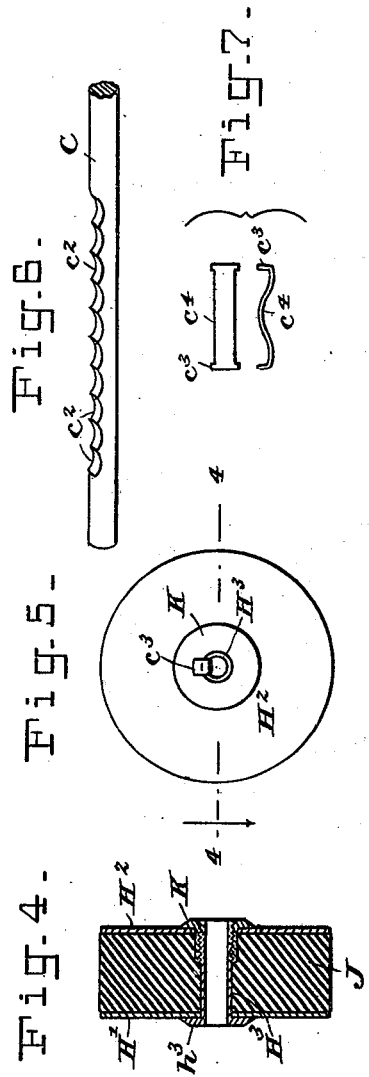
WITNESSES:
INVENTOR
David T. Stokes
BY Richards & Co
ATTORNEYS

UNITED STATES PATENT OFFICE.

DAVID T. STOKES, OF NEAR JOHANNESBURG, SOUTH AFRICAN REPUBLIC.

PARALLEL-RULER.

SPECIFICATION forming part of Letters Patent No. 684,005, dated October 8, 1901.

Application filed January 5, 1900. Serial No. 479. (No model.)

*To all whom it may concern:*

Be it known that I, DAVID T. STOKES, a citizen of the United States, residing on the property of the Geldenhuis Deep, Limited, near Johannesburg, in the South African Republic, have invented certain new and useful Improvements in Parallel-Rulers, of which the following is a specification.

This invention relates to that class of parallel-ruler which is provided with rollers or runners to maintain it in correct position while ruling a series or number of parallel lines, employed by bookkeepers, architectural, mechanical, and other draftsmen, and in other occupations or pursuits in which it may be desired from time to time to rule a sheet of paper, book, or other object with a number of parallel lines. It is designed with the following objects: (a) to render it possible to rule the lines equal distances apart, (b) to provide means for regulating the distances between the lines, (c) to permit the rollers to be adjusted so as to enable sheets of different widths to be ruled, and (d) to so construct the rollers as to permit of their being adjusted or set relative to each other and also to prevent the possibility of the ruler slipping while in use.

In order that the invention may be more readily comprehended, I append hereto an explanatory sheet of drawings, marked with letters of reference, corresponding to the following description thereof.

In the drawings, Figure 1 illustrates in elevation a parallel-ruler constructed in accordance with this invention. Fig. 2 is an end elevation of same. Fig. 3 is a plan. Fig. 4 is a transverse sectional elevation of one of the rollers D D', drawn to an enlarged scale. Fig. 5 is a side elevation of the roller. Fig. 6 illustrates detail views of the spindle C, showing the means for adjusting the rollers thereon. Fig. 7 illustrates detail views of the spring $c^4$ for maintaining the rollers D D' tight on the spindle C.

A is the ruler proper, preferably beveled off on one side, as seen at $a$, to form the ruling edge $a'$. The ruler is provided with a longitudinal slot B, terminating in two approximately semicylindrical holes or cavities $b\ b'$, which form an opening on the under side of the ruler, as seen at $b^4$ in Figs. 1 and 2.

In the ruler beyond the cavities $b\ b'$ brackets forming bearings $c\ c'$ are fitted, in which a longitudinally-arranged spindle C is free to rotate.

D D' are the rollers fixed to the spindle C within the cavities $b\ b'$. These rollers project slightly beyond the bottom or under surface of the ruler, as seen at $b^2$ in Figs. 1 and 2. At the center of the ruler a further curved hollow or cavity E is formed, in which rotates a central boss F on the spindle C. In the ruler in front of the boss F a recess G is formed, approximately equal in width to the boss F.

$h$ is a pin or spindle fitted within the recess, on which is mounted a spring-pressed catch H.

The boss F is formed with several divisions, three being illustrated in the drawings, and is provided on its circumference with equidistant grooves or notches $i$ for each division, with which the spring-catch H may be set to engage. The spring-catch H is capable of being moved along the pin or spindle $h$, so as to engage the notches in any of the divisions. The division $i'$ of the boss F may be grooved so as to arrest the movement of the ruler every quarter of an inch, the division $i^2$ every three-eighths of an inch, and the division $i^3$ every one-half inch, or any other desired distance. The spring-catch H is formed with a projection $h'$ to engage the grooves $i$, and it is maintained in contact with the boss F by means of the spring $h^2$. (See Fig. 2.)

It will be obvious that the boss or roller F may be constructed so as to rule one set of equidistant lines only, or that it may be arranged so as to give any desired combination.

In Figs. 4 and 5 the construction of one of the rollers D D' is illustrated. H' H² are two preferably metal disks fitted on a sleeve or tubular center piece H³, the disk H' resting against a flange or projection $h^3$ on the sleeve H³. J is a rubber ring interposed between the disks H' H², and K is a nut screwed onto the other end of the sleeve H³ for securing the several parts in position. By tightening the nut K on the sleeve H³ the rollers D D' may be adjusted to compensate for wear or to accurately adjust the rollers D D' relative to each other by expanding or contracting the rubber ring or center J.

In Figs. 3, 6, and 7, I illustrate the means by which the rollers D D' may be adjusted relatively to each other to rule sheets of paper of different widths. In this case the semicircular cavities $b$ $b'$ will be continued inward for some distance, as seen at L, forming an opening on the under side of the ruler through which the rollers D D' may project at any intermediate position. I prefer to construct both rollers adjustable, so as to maintain a true balance of the ruler, but one only may be made adjustable, if preferred, and the other be permanently attached to the spindle C. In order to temporarily secure the rollers D D' on the spindle C in any intermediate position within the cavities $b$ $b'$, notches or indentations $c^2$ are formed in the spindle C. A flat spring $c^4$, (see Fig. 7,) is placed inside the sleeve or tubular center piece $H^3$ of the rollers D D', bearing on the indentations $c^2$ and being held in position within the sleeve $H^3$ by means of the upturned edges or extremities $c^3$, which project to the outside of the sleeve $H^3$, as seen in Fig. 5. On applying a slight pressure to the side of the rollers the springs yield and slide over the indentations, and thus permit any desired adjustment to be effected. When no adjustment of the rollers D D' is desired, they may be secured to the spindle C within the cavities $b$ $b'$, as seen at O, Fig. 3.

If desired, the ruler may be fitted with a folding set-square and protractor M, one end of the ruler being provided with a slot $m$, into which it folds, the set-square being pivoted on the pin or pivot $n$.

In use the spring-catch H will first be set so as to engage the grooves in the boss F corresponding to the distance the lines are to be ruled apart. The ruler is then placed in position, and after a line has been ruled the spring-catch is raised and the ruler rolled backward until the spring-catch H engages the next groove, when the operation is again repeated.

Having thus described my invention, what I claim, and desire to protect by Letters Patent, is—

1. In a parallel-ruler, in combination, the ruler proper A, the cavities $b$ $b'$ formed therein and opening on the under side thereof, the longitudinal slot B between the cavities $b$ $b'$, the spindle C and its bearings $c$ $c'$, the rollers D D' mounted on the spindle C within the cavities $b$ $b'$, the central cavity E of the ruler A, the boss F of the spindle C provided with the three sets of grooves, the recess G of the ruler A formed in front of the boss F, the pin $h$ fitted therein, the spring-catch H mounted on the pin $h$ and capable of being moved lengthwise thereof to engage each of the sets of grooves in the divisions $i'$ $i^2$ $i^3$ substantially as set forth.

2. A parallel-ruler having the spindle, on which the rollers are fitted, formed with notches or indentations at one end, the rollers being provided with a spring bearing against said notches to permit of adjustment of the rollers lengthwise of the ruler, substantially as described.

3. In a parallel-ruler the combination of the ruler A, the cavities $b$ $b'$ and longitudinal slot B, the spindle C, and the brackets or bearings $c$ $c'$, the notches $c^2$ on the end of the spindle C, the rollers D D' comprising the tubular center piece $H^3$, the disks $H'$ $H^2$, the rubber ring J and nut K, the springs $c^4$ for maintaining the rollers D D' in position on the spindle C, the boss F of the spindle C formed of the several divisions $i'$ $i^2$ $i^3$, the recess G, the pin $h$, the spring-catch H mounted on the pin $h$ capable of being set to engage grooves $i$ in each of the divisions $i'$ $i^2$ $i^3$, and the recess $m$ and folding protractor and set-square M substantially as described.

In witness whereof I have hereunto set my hand in presence of two witnesses.

DAVID T. STOKES.

Witnesses:
R. OVENDALE,
G. I. FISCHER.